United States Patent
Cheng et al.

(10) Patent No.: US 12,354,371 B1
(45) Date of Patent: Jul. 8, 2025

(54) DETECTION AND FILTERING OF ABNORMAL SENSOR DATA FOR OBJECT DETECTION IN AUTOMOTIVE APPLICATIONS

(71) Applicant: VicOne Corporation, Tokyo (JP)

(72) Inventors: Yi-Li Cheng, Taipei (TW); Jui Chang Hsu, Taipei (TW); Shih-Han Hsu, Taipei (TW)

(73) Assignee: VicOne Corporation, Tokyo (JP)

( * ) Notice: Subject to any disclaimer, the term of this patent is extended or adjusted under 35 U.S.C. 154(b) by 413 days.

(21) Appl. No.: 17/984,631

(22) Filed: Nov. 10, 2022

(51) Int. Cl.
| | |
|---|---|
| G06V 20/58 | (2022.01) |
| G01S 7/48 | (2006.01) |
| G01S 17/86 | (2020.01) |
| G01S 17/89 | (2020.01) |
| G06V 10/26 | (2022.01) |
| G06V 10/36 | (2022.01) |
| G06V 10/74 | (2022.01) |

(52) U.S. Cl.
CPC ............ *G06V 20/58* (2022.01); *G01S 7/4808* (2013.01); *G01S 17/86* (2020.01); *G01S 17/89* (2013.01); *G06V 10/267* (2022.01); *G06V 10/36* (2022.01); *G06V 10/761* (2022.01)

(58) Field of Classification Search
CPC .... G06V 20/58; G06V 10/761; G06V 10/267; G06V 10/36; G01S 17/86; G01S 7/4808; G01S 17/89
See application file for complete search history.

(56) References Cited

U.S. PATENT DOCUMENTS

| | | | |
|---|---|---|---|
| 2020/0198651 A1 | 6/2020 | Levy et al. | |
| 2022/0398851 A1* | 12/2022 | Nehmadi | G01S 17/931 |
| 2024/0383560 A1* | 11/2024 | Xiang | G05D 1/027 |

OTHER PUBLICATIONS

Liu, Jinshan, and Jung-Min Park. ""seeing is not always believing": Detecting perception error attacks against autonomous vehicles." IEEE Transactions on Dependable and Secure Computing 18.5 (2021): 2209-2223. (Year: 2021).*
Li, Xiang Hua et. al, "Detection of tampered region for JPEG images by using mode-based first digit features" EURASIP Journal on Advances in Signal Processing, SpringOpen Journal, http://asp.eurasipjournals.com/content/2012/1/190, 2012.

(Continued)

*Primary Examiner* — Utpal D Shah
(74) *Attorney, Agent, or Firm* — Beyer Law Group LLP

(57) ABSTRACT

An object detection system of a vehicle includes a camera and a LIDAR sensor. The camera and the LIDAR sensor sense an environment to generate an image and a point cloud that depict the environment. The image and point cloud are preprocessed to facilitate comparison between the image and the point cloud. Similarity between the image and the point cloud in depicting the environment is determined to detect abnormal sensor data. Abnormal sensor data is further detected based on directional pattern strengths of edges of the image and expanded points of the point cloud. Detected abnormal sensor data in the image and point cloud are filtered to generate a secure image and a secure point cloud, which are provided to a perception engine to detect objects or other features in the environment.

9 Claims, 15 Drawing Sheets

(56) References Cited

OTHER PUBLICATIONS

Frank, Joel et. al "Leveraging Frequency Analysis for Deep Fake Image Recognition", 37th International Conference on Machine Learning, https://arxiv.org/abs/2003.08685, ICML Jun. 26, 2020.

Zhao, Yiming et. al, "A Surface Geometry Model for LiDar Depth Completion", IEEE Robotics and Automation Letters, vol. 6, No. 3, Jul. 3, 2021.

Cao, Yulong et. al, "Invisible for both Camera and LiDar: Security of Multi-Sensor Fusion based Perception in Autonomous Driving Under Physical-World Attacks", https://arxiv.org/abs/2106.09249, Jun. 17, 2021.

"Advanced driver-assistance systems", Wikipedia, https://en.wikipedia.org/wiki/Advanced_driver-assistance_system, Apr. 21, 2022.

Cao, Yulong et. al, "Demo: Security of Multi-Sensor Fusion based Perception in AD under Physical-World Attacks", Workshop on Automotive and Autonomous Vehicle Security, https://dx.doi.org/10.14722/autosec.2022.23038 Apr. 24, 2022.

Bhanushali, Darshan, LiDAR-Camera Fusion for 3D Object Detection, https://doi.org/10.2352/ISSN.2470-1173.2020.16.AVM-257, Creative Commons Attribution 4.0 International License, IS&T International Symposium on Electronic Imaging 2020 Autonomous Vehicles and Machines Conference, 2020.

Tyagi, Mrinal, HOG (Histogram of Oriented Gradients): An Overview, https://towardsdatascience.com/hog-histogram-of-oriented-gradients-67ecd887675f, Jul. 4, 2021.

"Image gradient", Wikipedia, https://en.wikipedia.org/wiki/Image_gradient, Aug. 24, 2022.

Bergman Paul et al., "Anomaly Detection in 3D Point Clouds using Deep Geometric Descriptors", https://doi.org/10.48550/arXiv.2202.11660, Feb. 23, 2022.

Dey, Emon Kumar, "An unsupervised outlier detection method for 3D point cloud data", IGARSS 2019—2019 IEEE International Geoscience and Remote Sensing Symposium, Yokohama, Japan, 2019, pp. 2495-2498, doi: 10.1109/IGARSS.2019.890011.

Mendez, Javier et al., "Camera-LiDAR Multi-Level Sensor Fusion for Target Detection at the Network Edge", Sensors 2021, https://doi.org/10.3390/s21123992, Jun. 9, 2021.

"Types of Morphological Operations" https://www.mathworks.com/help/images/morphological-dilation-and-erosion.html, 2023.

"What Is Lidar-Camera Calibration?" https://www.mathworks.com/help/lidar/og/lidar-camera-calibration.html, 2023.

* cited by examiner

SIMILARITY SCORE MAP OF NORMAL SENSOR DATA

SIMILARITY SCORE MAP OF ABNORMAL SENSOR DATA

| 511 | 512 | 513 | 514 | 515 |
|---|---|---|---|---|
| 516 | 517 | 518 | 519 | 520 |
| 521 | 522 | 523 | 524 | 525 |
| 526 | 527 | 528 | 529 | 530 |
| 531 | 532 | 533 | 534 | 535 |

FIG. 13

DETECTION AND FILTERING OF ABNORMAL SENSOR DATA FOR OBJECT DETECTION IN AUTOMOTIVE APPLICATIONS

TECHNICAL FIELD

The present invention is directed to automotive cybersecurity.

BACKGROUND

Object detection systems in automotive sensing applications, such as in Advanced Driver-Assistance Systems (ADAS) and Autonomous Driving (AD) systems, employ a variety of sensors to detect objects and respond accordingly. Examples of these sensors include Light Detection and Ranging (LIDAR) sensors and cameras. Generally speaking, the sensors generate sensor data, which is a depiction of an environment as sensed by the sensor. The form of the sensor data depends on the sensor. For example, LIDAR sensors depict the environment in terms of point clouds, whereas cameras depict the environment in terms of two-dimensional (2D) images. A perception engine receives and processes the sensor data to detect objects or other features in the environment.

Object detection systems in automotive sensing applications can be attacked by malicious actors ("attackers") by fooling the sensors such that objects are not correctly detected. Examples of such attacks include shooting lasers at the LIDAR sensor, and adding stickers, posters, or paintings to traffic signs to confuse cameras. Multi-Sensor Fusion (MSF)-based perception engines have been developed to make object detection systems difficult to attack. An MSF-based perception engine processes point clouds using a LIDAR perception network, processes images using a camera perception network, and fuses the processing results of the LIDAR and camera perception networks to detect objects. Yulong Cao et al., "Invisible for both Camera and LIDAR: Security of Multi-Sensor Fusion based Perception in Autonomous Driving Under Physical-World Attacks", Proceedings—2021 IEEE Symposium on Security and Privacy, S P 2021, pp. 176-194 (2021), provides a basic description of MSF-based perception engines and how it can be attacked with adversarial objects.

BRIEF SUMMARY

In one embodiment, an object detection system for a vehicle includes a camera and a LIDAR sensor. The camera and the LIDAR sensor sense an environment to generate an image and a point cloud that depict the environment. The image and point cloud are preprocessed to facilitate comparison between the image and the point cloud. Similarity between the image and the point cloud in depicting the environment is determined to detect abnormal sensor data. Abnormal sensor data is further detected based on directional pattern strengths of edges of the image and expanded points of the point cloud. Detected abnormal sensor data in the image and/or point cloud are filtered to generate a secure image and a secure point cloud, which are provided to a perception engine to detect objects or other features in the environment.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 13 schematically shows filtering of abnormal grids in accordance with an embodiment of the present invention.

DETAILED DESCRIPTION

In the present disclosure, numerous specific details are provided, such as examples of systems, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
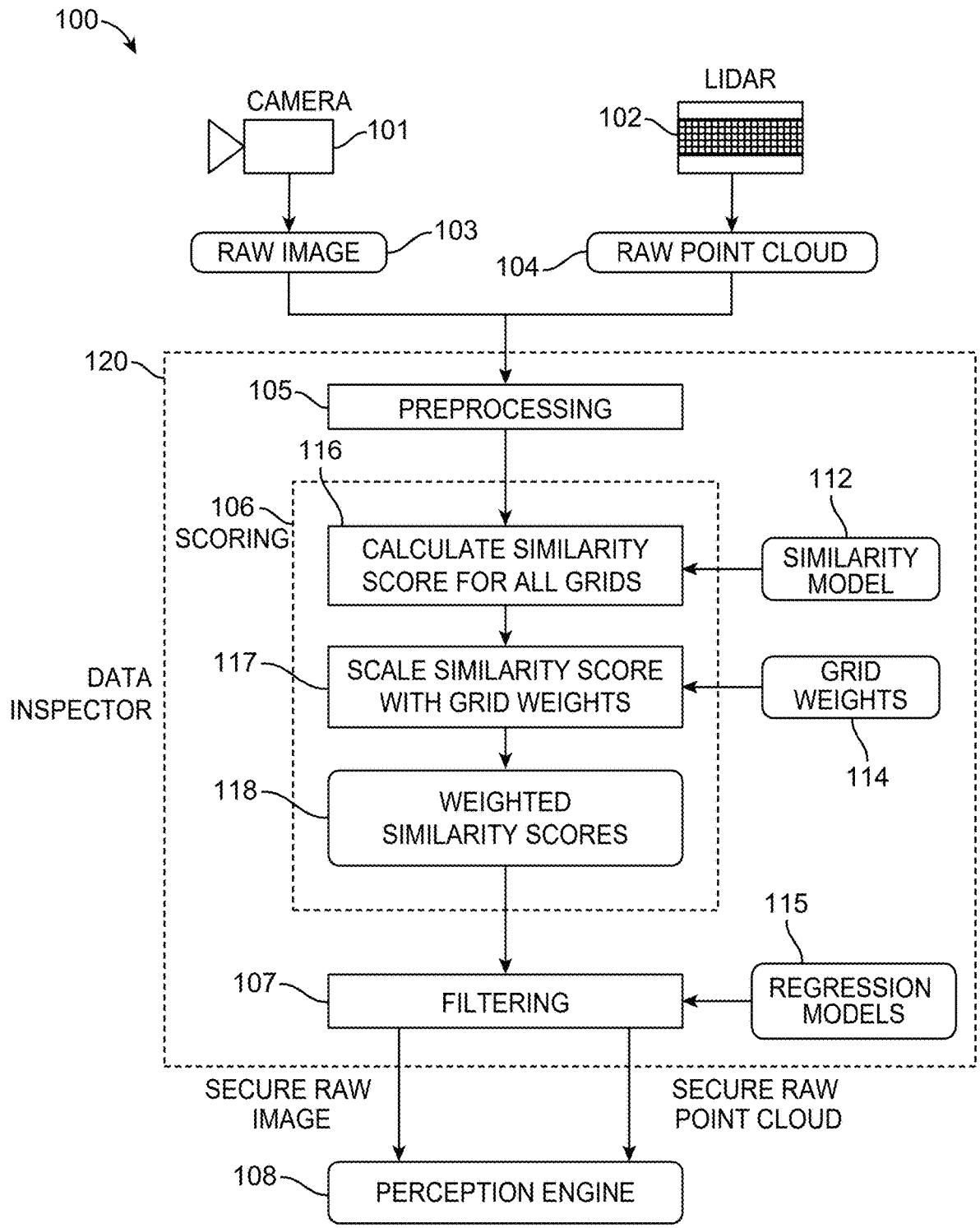
FIG. 1 shows a logical diagram of an object detection system in accordance with an embodiment of the present invention.

FIG. 1 shows a logical diagram of an object detection system 100 in accordance with an embodiment of the present invention. In one embodiment, the object detection system 100 is deployed on a vehicle as part of an Advanced Driver-Assistance System (ADAS), Autonomous Driving (AD) system, or other automotive sensing application. The object detection system 100 includes sensors in the form of a camera 101 and a LIDAR sensor 102, a data inspector 120, and a perception engine 108. The camera 101 and the LIDAR sensor 102 may sense an environment that is forward of the vehicle or at other orientation relative to the vehicle.

The LIDAR sensor 102 scans an environment to generate point clouds that depict the environment as sensed by the LIDAR sensor 102. The camera 101 generates 2D images that depict the environment as sensed by the camera 101. The LIDAR sensor 102 and the camera 101 may comprise conventional LIDAR sensors and cameras that are commonly-employed for object detection in automotive sensing applications. The LIDAR sensor 102 and the camera 101 provide a pair of sensor data of the environment at any given capture time.

The perception engine 108 may be a conventional MSF-based perception engine. The perception engine 108 receives pairs of images and point clouds to detect objects or other features in the environment.

The data inspector 120 comprises one or more modules for receiving raw sensor data from the camera 101 and the LIDAR sensor 102, detecting abnormal sensor data in the raw sensor data, filtering the abnormal sensor data to generate secure raw sensor data, and providing the secure raw sensor data to the perception engine 108. Sensor data (image or point cloud) before processing by the data inspector 120 is referred to herein as "raw" and sensor data after processing by the data inspector 120 is referred to herein as "secure".

Abnormal sensor data is sensor data that is indicative of an attack on the object detection system 100. Filtering the abnormal sensor data includes transforming the abnormal sensor data, removing the abnormal sensor data, or other operation on the abnormal sensor data such that the abnormal sensor data does not adversely affect the operation of the perception engine 108. Filtering the abnormal sensor data from the raw sensor data prevents the perception engine 108 from being confused by attackers, thereby allowing the perception engine 108 to operate normally. In one embodiment, the data inspector 120 filters abnormal sensor data such that the abnormal sensor data is ignored by the perception engine 108. The raw image and the raw point cloud with their abnormal sensor data having been filtered are provided to the perception engine 108 as secure raw image and secure raw point cloud, respectively.

In one embodiment, the modules of the data inspector 120 are implemented in software, i.e., instructions that when executed by a processor of the object detection system 100 cause the object detection system 100 to perform the functions of the modules. As can be appreciated, the modules of the data inspector 120 may also be implemented in hardware (e.g., programmable logic) or a combination of hardware and software. The data inspector 120 comprises modules for performing the following processes: preprocessing 105, scoring 106, and filtering 107.

The preprocessing 105 receives the raw sensor data, which in the example of FIG. 1 is a raw image (FIG. 1, 103) from the camera 101 and a raw point cloud (FIG. 1, 104) from the LIDAR sensor 102. The preprocessing 105 transforms the raw sensor data into a format that facilitates comparison between the image and the point cloud. In one embodiment, the preprocessing 105 includes converting the image to a gradient image, and expanding points of the point cloud to generate an expanded point cloud. The image to gradient image conversion may be performed by converting the pixel map of the image to a gradient map. The gradient image indicates the strength of changes in intensity or color between pixels in a given direction, which in one embodiment is horizontally. The gradient image enhances detection of and provides context to edges of the image.

Expansion of points of the point cloud allows points that are closer to the vehicle to be emphasized. The expansion creates edges that indicate directional pattern strength of the point cloud, which can be compared to the directional pattern strength of the gradient image. In one embodiment, the points of the point cloud are expanded along the horizontal direction, such as by performing a morphological operation (e.g., dilation) on the points.

To further facilitate comparison of the image and point cloud, the image and point cloud are each divided into a plurality of corresponding grids, with each grid being an N×M rectangular region. That is, each grid of the image has a corresponding grid of the point cloud for the same region of the sensed environment. The LIDAR sensor 102 and the camera 101 may come as a pair of calibrated sensors from a sensor vendor, so that the corresponding grids of the image and point cloud have sensor data that depict the same region of the sensed environment. For ease of discussion, in the present disclosure, a reference to a grid refers to the portion of sensor data on the grid.

In one embodiment, after the preprocessing 105, the scoring 106 includes calculating a similarity score for each grid (FIG. 1, 116). The similarity score may be calculated using a similarity model 112. The similarity score is indicative of the similarity between the image and point cloud on the same grid in depicting a region of the sensed environment. That is, if the environment is benign, both the image and the point cloud would be very similar in their depiction of the environment. However, if the environment is abnormal, such as when at least one of the camera or LIDAR sensor has been attacked, the image and the point cloud would be dissimilar in depicting the environment. This is because one sensor would be sensing something different relative to the other sensor.

The similarity model 112 may be trained using a training dataset of samples, with each sample being a pair of sensor data, i.e., image and corresponding point cloud. The training samples for training the similarity model 112 may include positive pairs (i.e., the image and point cloud are normal) and negative pairs (i.e., the image and/or point cloud is abnormal). The training with positive and negative pairs allow the similarity model 112 to provide an indication on whether an image and a point cloud on a given grid are similar. The similarity indication may be in terms of a similarity score. In one embodiment, the higher the similarity score, the more similar the image and point cloud and the higher the likelihood that the grid is normal. The lower the similarity score, the more dissimilar the image and the point cloud and the higher the likelihood that the grid is abnormal.

The scoring 106 includes scaling the similarity scores of the grids of sensor data (FIG. 1, 117). The scaling allows more relevant grids, based on their location on the grid map, to have more impact on the determination of whether a grid is normal or abnormal. The scaling may be performed using grid weights 114, which provide a scaling weight for each grid. The grid weights 114 are static in that they are not changed during operation; the grid weights 114 may be updated by retraining using updated training dataset. The grid weights 114 are applied to similarity scores on corresponding grids, resulting in each grid having a weighted similarity score (FIG. 1, 118). A grid weight 114 may be applied to a similarity score of a corresponding grid by adding the grid weight 114 to the similarity score, multiplying the similarity score by the grid weight 114, or other scaling operation on the similarity score involving the grid weight 114.

The grid weights 114 are based on relevancy of particular grids in detecting abnormal grids. The grid weights 114 may be generated based on correlation scores between members of pairs of sensor data through all time bins of the training dataset. A statistical algorithm, such as mean or regression, may be applied on the correlation scores to generate a single grid weights table that may be used as the grid weights 114.

The weighted similarity scores of the grids (FIG. 1, 118) are subjected to the filtering 107, which detects and filters abnormal grids from consideration by the perception engine 108. The filtering 107 selects grids with a weighted similarity score that is equal or greater than a threshold. Grids that are not selected, i.e., those with a similarity score lower than the threshold, are deemed abnormal and filtered so that their sensor data are ignored by the perception engine 108.

The filtering 107 further detects abnormal sensor data based on directional pattern strengths of the gradient image and expanded point cloud. The directional pattern strength of a gradient image is a measure of accounting the number of edges in quantized orientations of the image, and the directional pattern strength of an expanded point cloud is a measure of the change of object contour based on horizontally expanded points of the point cloud. In one embodiment, each grid has a corresponding regression model 115, with each regression model 115 having a polynomial regression curve. A grid where the directional pattern strength of the gradient image and/or the expanded point cloud is not within a predetermined distance of the polynomial regression curve for the grid is deemed to be abnormal.

The filtering 107 provides the secure raw image and the secure raw point cloud to the perception engine 108. The secure raw image and secure raw point cloud are the raw image and the raw point cloud, respectively, with portions of the raw image and the raw point cloud on abnormal grids being filtered so that they are not considered by the perception engine 108 for object detection.

Figure 2:
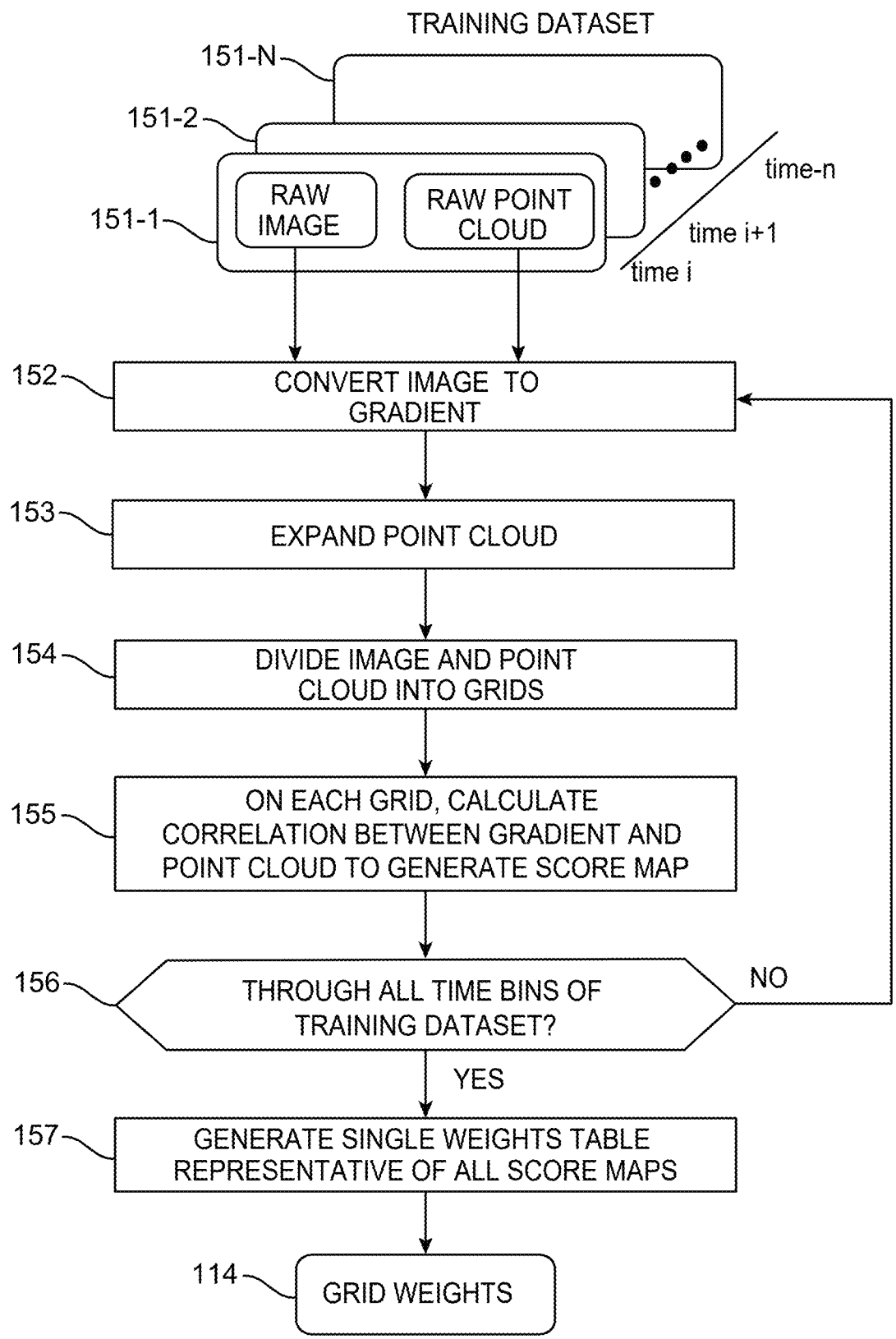
FIG. 2 shows a flow diagram of a method of generating grid weights in accordance with an embodiment of the present invention.

FIG. 2 shows a flow diagram of a method of generating the grid weights 114 in accordance with an embodiment of the present invention. The generation of the grid weights 114 may be a one-time operation that is performed when the object detection system 100 is first deployed on the vehicle. In the example of FIG. 2, a training dataset for generating the grid weights 114 comprises a plurality of samples 151-1, 151-2, . . . , 151-n that have been captured at time-i, time-i+1, . . . , time-n, respectively. The samples 151 are normal samples, i.e., they are benign. The samples 151 may have been captured when the object detection system 100 was first deployed on the vehicle and the vehicle was driven around a known benign environment.

A sample 151 has an image and corresponding point cloud of the same environment at a particular capture time. Steps 152-155 are performed for each sample 151. Each of the samples 151 undergoes preprocessing as in the preprocessing 105 of FIG. 1. More particularly, the raw image is converted to a gradient image (FIG. 2, 152) and points of the raw point cloud are horizontally expanded (FIG. 2, 153). Each of the image and point cloud is then divided into a plurality of corresponding grids (FIG. 2, 154).

Generally, grids that are closer to the top of the image represent views that are farther from the vehicle than grids that are closer to the bottom of the image. A LIDAR sensor generally does not receive enough return signals from objects that are far from the sensor. Accordingly, in one embodiment, lower weights are assigned to grids that are closer to the top of the image and corresponding grids of the point cloud. Conversely, grids that are closer to the bottom of the image indicate closer views. Higher weights are thus assigned to grids that are closer to the bottom of the image and corresponding grids of the point cloud.

For each grid, a correlation score is calculated for the gradient image and the expanded point cloud on the grid (FIG. 2, 155). The correlation score of a grid is indicative of similarity between the image and point cloud on the grid. The correlation scores of the grids may be assembled into a correlation score map. A correlation score map is generated for each of the samples 151 in the training data set (FIG. 2, 156). A single weights table that represents the correlation score maps of all the samples 151 is generated (FIG. 2, 157). The single weights table, which is used as the grid weights 114, may be generated by performing a statistical operation, such as mean or regression, on all of the correlation score maps.

Figure 3:
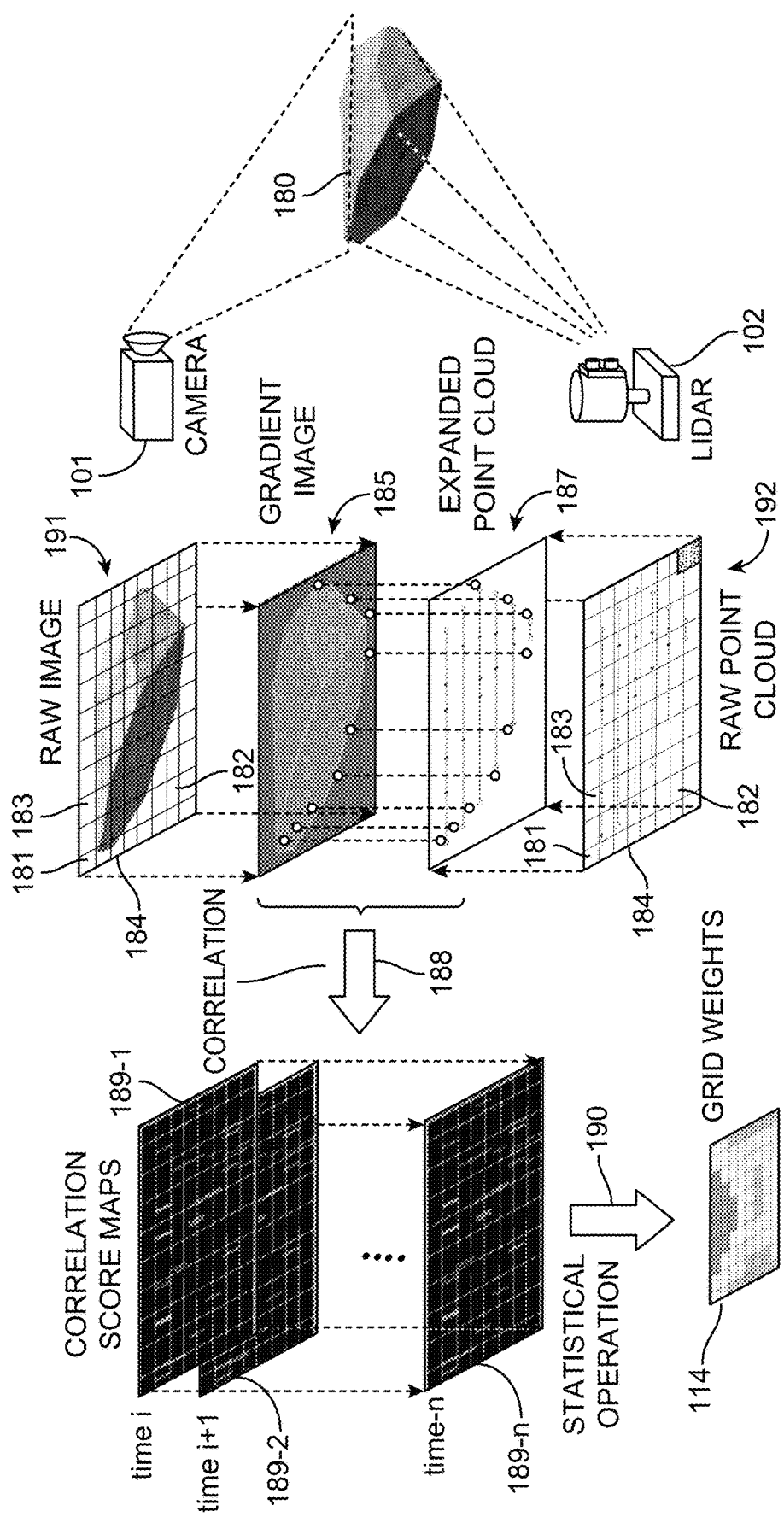
FIG. 3 pictorially illustrates the method of FIG. 2 in accordance with an embodiment of the present invention.

FIG. 3 is a pictorial illustration of the method of FIG. 2 in accordance with an embodiment of the present invention. In the example of FIG. 3, an object 180 is sensed by the camera 101 and the LIDAR sensor 102 as the vehicle moves towards (or away) from the object 180. For each sample capture, the camera 101 generates a raw image (FIG. 3, 191) and the LIDAR sensor 102 generates a raw point cloud (FIG. 3, 192). The raw image and raw point cloud are shown with a grid map 184, which comprises a plurality of corresponding grids. Each grid of the raw image has a corresponding grid of the raw point cloud for a particular portion of the sensed environment that includes the object 180. In the example of FIG. 3, the grids 181-183 in the raw image (FIG. 3, 191) and the raw point cloud (FIG. 3, 192) are labeled to illustrate corresponding grids of the raw image and the raw point cloud. For example, a portion of the raw image and a portion of the raw point cloud on the grid 181 are considered as being on the same grid. The mapping provided by the grid map 184 applies to the image and the point cloud in general, including to the gradient image and expanded point cloud.

In the example of FIG. 3 as part of preprocessing, the raw image is converted to a gradient image (FIG. 3, 185), the points of the raw point cloud are expanded (FIG. 3, 187), and the each of the image and point cloud is divided into a plurality of grids as represented by the grid map 184.

For each grid, a correlation score is generated by calculating a correlation between the gradient image and the expanded point cloud on the grid (FIG. 3, 188). The correlation scores of the grids are reflected in a correlation score map 189 (i.e., 189-1, 189-2, . . . , 189-n). Correlation score maps 189 are generated for all samples in the training dataset for all time. A statistical operation (FIG. 3, 190) is applied to all of the correlation score maps 189 to generate the grid weights 114.

Figure 4:
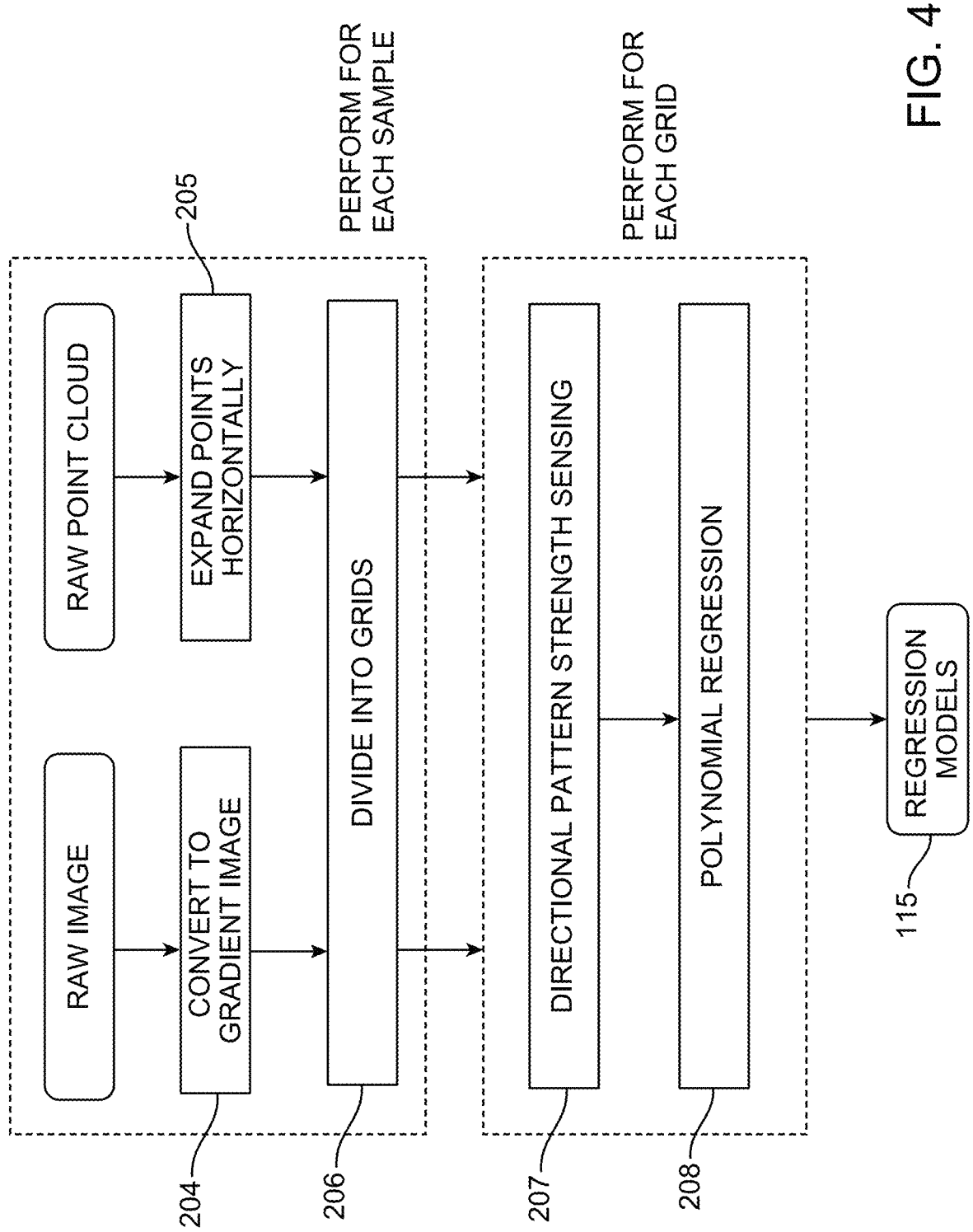
FIG. 4 shows a flow diagram of a method generating a regression model in accordance with an embodiment of the present invention.

FIG. 4 shows a flow diagram of a method of generating a plurality of regression models 115 in accordance with an embodiment of the present invention. The regression models 115, one for each grid of sensor data, may be generated when the object detection system 100 is first installed on the vehicle. The generation of the regression models 115 may be a one-time operation, with the regression models 115 being generated using samples of the same training dataset used to generate the grid weights 114. The regression models 115 allow for detection of an abnormal grid based on the directional pattern strengths of the gradient image and expanded point cloud on the grid.

The generation of a regression model 115 is initiated by preprocessing each sample to generate a gridded gradient image and a gridded expanded point cloud as previously described. More particularly, for each sample, the raw image is converted to a gradient image (FIG. 4, 204) and the points of the raw point cloud are horizontally expanded (FIG. 4, 205). The image may be converted to a gradient image by converting the pixel map of the image to a gradient map.

Points of the point cloud may be horizontally expanded by performing a morphological operation (e.g., dilation) on the points. The gradient image and the expanded point clouds are divided into a plurality of corresponding grids (FIG. 4, 206).

Figure 5:
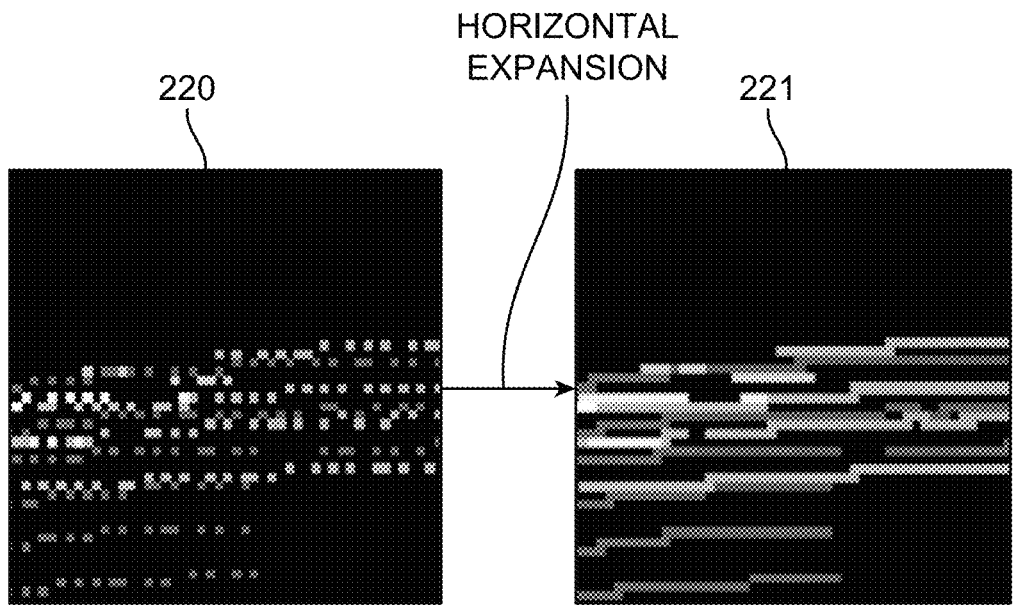
FIG. 5 pictorially illustrates expansion of points of a point cloud in accordance with an embodiment of the present invention

FIG. 5 shows a pictorial illustration of expansion of points of a point cloud. In the example of FIG. 5, an example grid 220 is a grid of a point cloud. A morphological operation is performed on the points in the grid 220 to expand the points horizontally as in the grid 221.

Referring back to FIG. 4, the preprocessing steps 204-206 are performed for each sample. The steps 207 and 208 are performed for each grid of a preprocessed sample.

Directional pattern strength sensing is performed to find the number of straight lines of quantized orientation (e.g., in terms of degree angle) within the sensor data and generate a histogram based on the quantized orientation of the lines (e.g., bin into 0°, 30°, 60°, 90°, 180°)(FIG. 4, 207). An example directional pattern strength sensing algorithm is histogram of oriented gradient. For the gradient image, the lines for directional pattern strength sensing are the edges of the gradient image. For the expanded point cloud, the lines for directional pattern strength sensing are the edges of the horizontally-expanded points of the point cloud.

For each grid, a polynomial regression is performed on the directional pattern strengths of the gradient image and expanded point cloud to generate a regression model 115 for the grid (FIG. 4, 208). The regression model 115 indicates the relationship between the directional pattern strength of the gradient image and the directional pattern strength of the expanded point cloud on the same grid.

Figure 6:
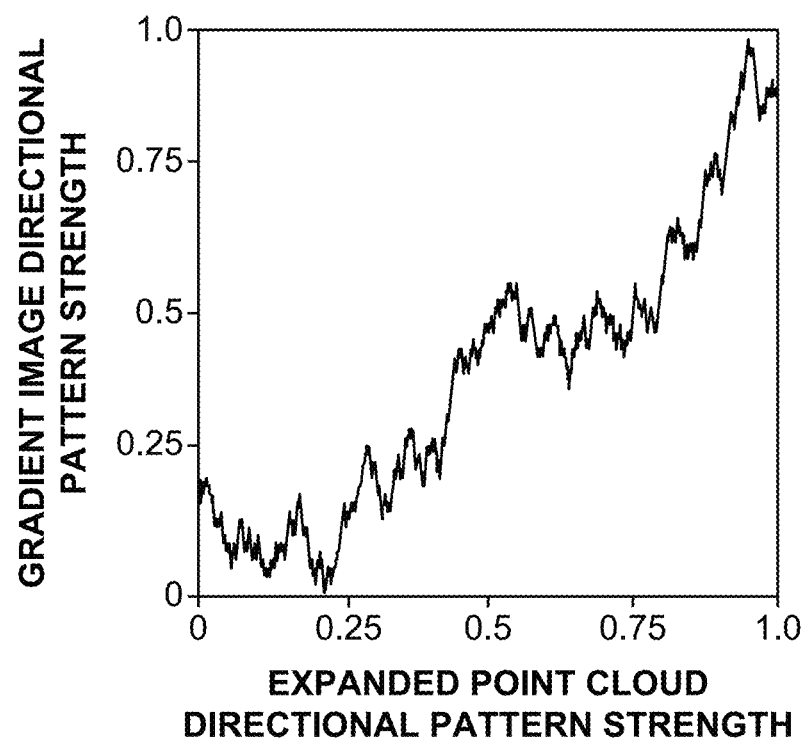
FIG. 6 shows an example regression model for a grid in accordance with an embodiment of the present invention.
Figure 7:
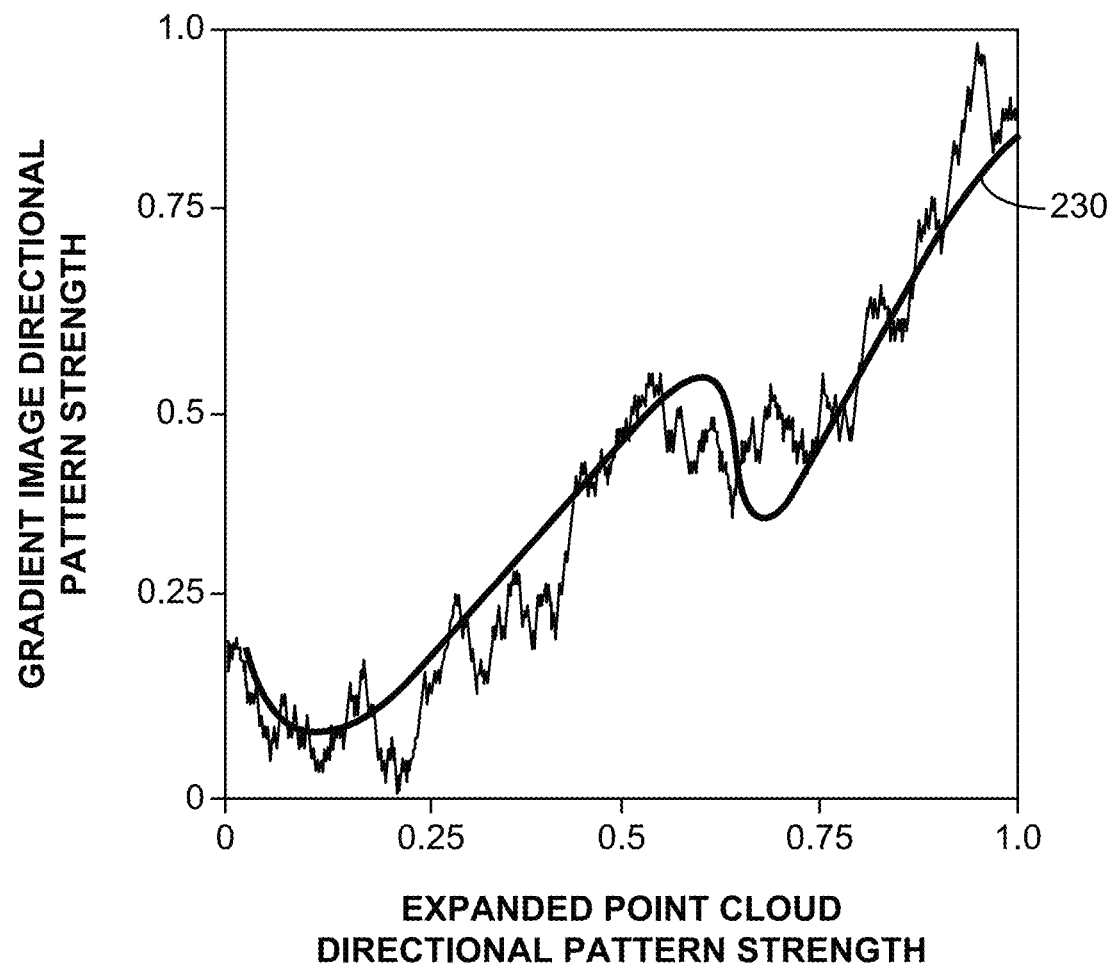
FIG. 7 shows a regression curve that is fitted to the directional pattern strengths of FIG. 6 in accordance with an embodiment of the present invention.

FIG. 6 shows an example regression model 115 for a grid in accordance with an embodiment of the present invention. In the example of FIG. 6, the horizontal axis indicates directional pattern strength of the expanded point cloud and the vertical axis indicates the directional pattern strength of the image. The directional pattern strengths have been scaled to a value of 0.0 to 1.0. FIG. 7 shows a regression curve 230 that is fitted to the directional pattern strengths of FIG. 6 in accordance with an embodiment of the present invention. The regression curve 230 may be used as a regression model 115 for the grid. It is to be noted that each grid is assigned its own regression model 115 because the grids are on different locations on the grid map, and locations on the grid map have different characteristics due to the orientation of the camera and the LIDAR sensor relative to corresponding regions of the sensed environment, reflectivity of objects, etc.

Figure 8:
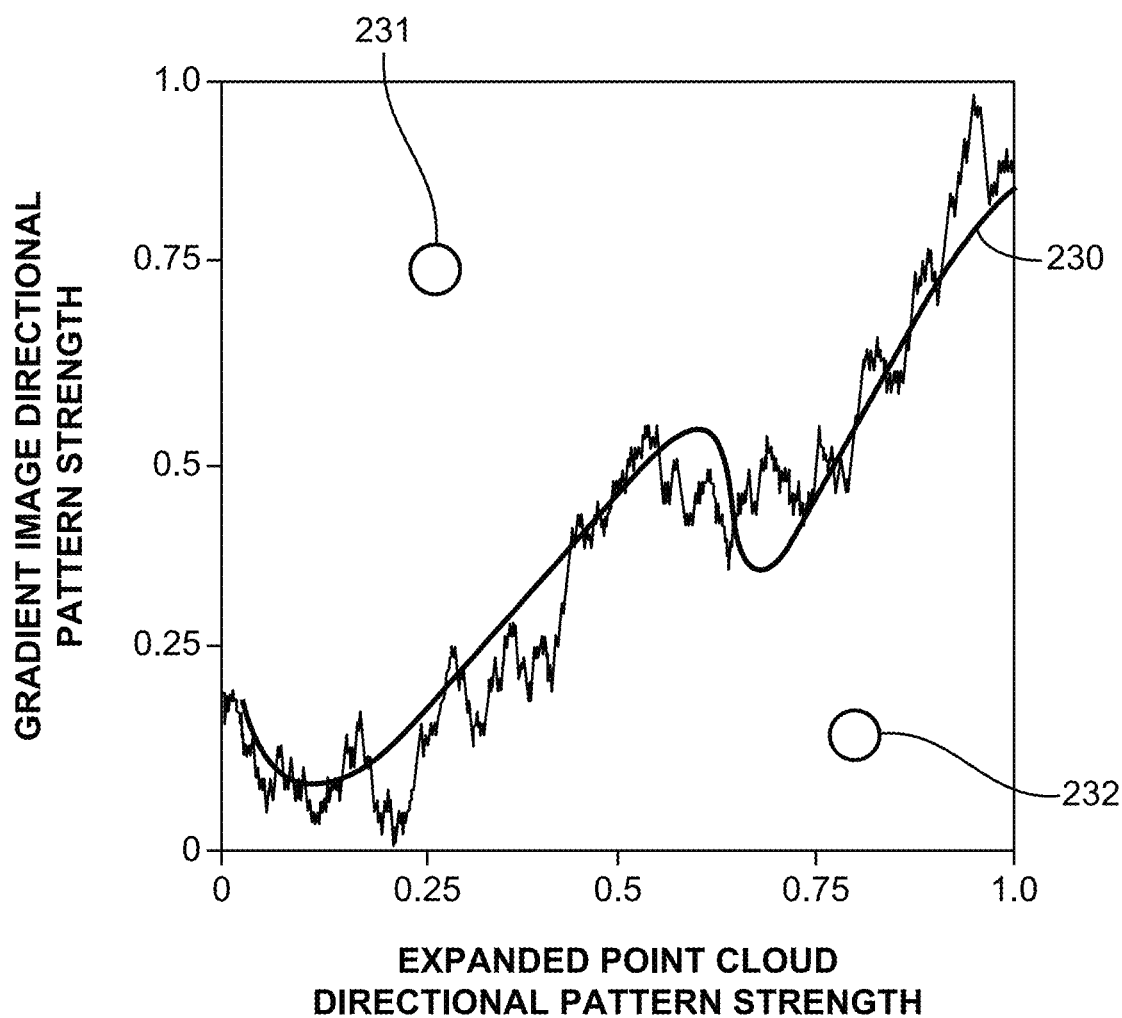
FIG. 8 shows an example of comparing directional pattern strengths to the regression curve of FIG. 7, in accordance with an embodiment of the present invention.

A grid having gradient image and expanded point cloud directional pattern strengths that are not within a predetermined distance of the regression curve 230 may be deemed to be abnormal and accordingly filtered. This is illustrated in FIG. 8, where a data point 231 is for a grid where the gradient image has a high directional pattern strength, but the expanded point cloud has a low directional pattern strength. Also in FIG. 8, a data point 232 is for a grid where the gradient image has a low directional pattern strength, but the expanded point cloud has a high directional pattern strength. The data points 231 and 232 do not follow the regression curve 230, i.e., the data points 231 and 232 are not within expected distance to the regression curve 230. Accordingly, the grids represented by the data points 231 and 232 are deemed to be abnormal grids.

Figure 9:
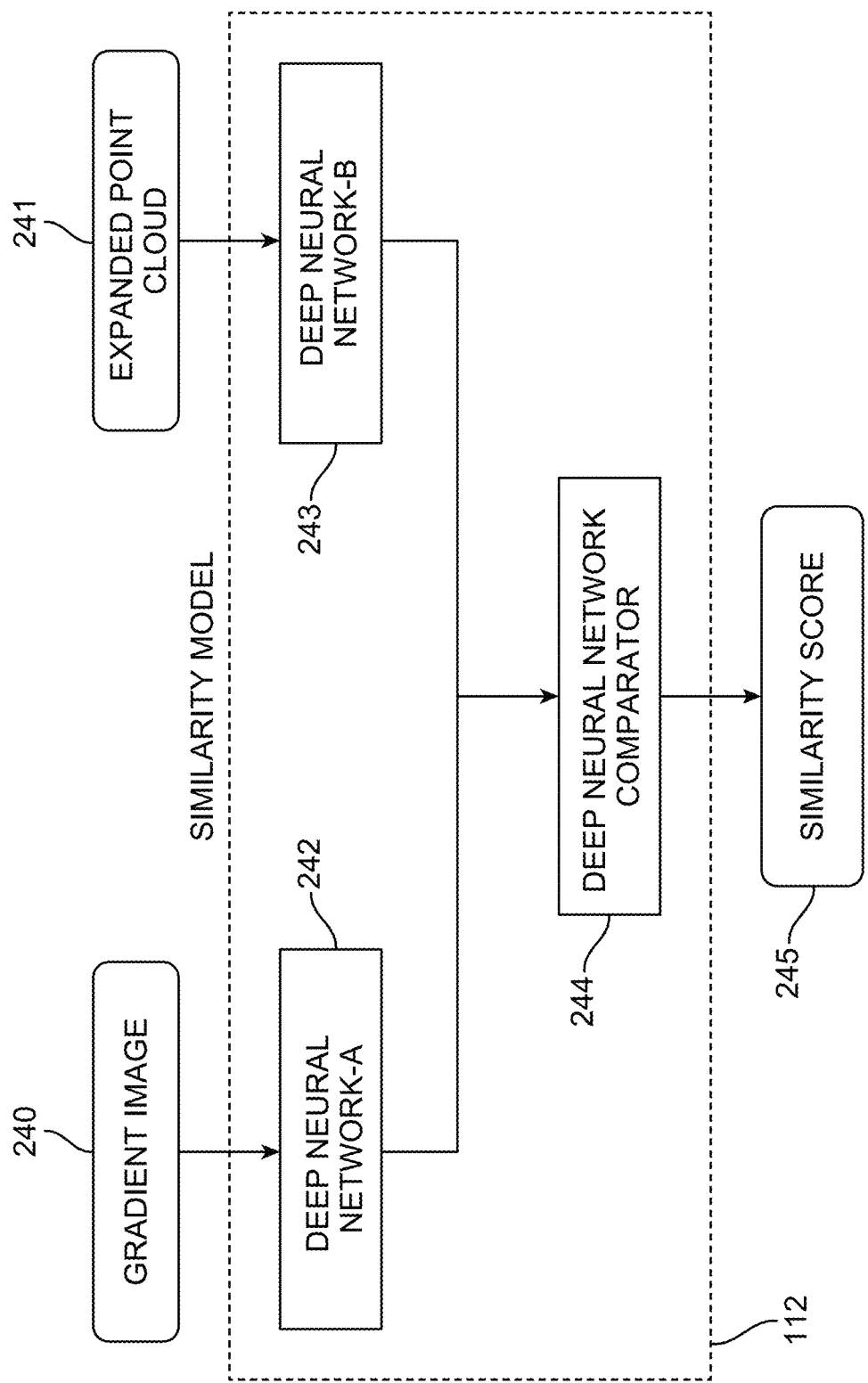
FIG. 9 shows a logical diagram of a similarity model in accordance with an embodiment of the present invention.

FIG. 9 shows a logical diagram of the similarity model 112 in accordance with an embodiment of the present invention. The similarity model 112 receives preprocessed sensor data, which in the example of FIG. 9 are a gradient image (FIG. 9, 240) and corresponding expanded point cloud (FIG. 9, 241) of a grid. The similarity model 112 operates in similar fashion to a Siamese Neural Network. More particularly, a deep neural network 242 and a deep neural network 243 are identical subnetworks, in that they have the same configuration with the same parameters and weights before training the network. The deep neural network comparator 244 is another neural network that receives the outputs of the deep neural networks 242 and 243 as inputs to generate a similarity score indicating the similarity between the gradient image and the expanded point cloud on the grid. The deep neural network comparator 244 may generate the similarity score from the outputs of the deep neural networks 242 and 243 by peak signal-to-noise-ratio (PSNR), entropy, mean squared error (MSE), or other similarity scoring function. A similarity score is generated for each grid (FIG. 9, 245).

The similarity model 112 may be trained using positive and negative pairs of samples. A positive pair consists of a normal grid of gradient image and a corresponding normal grid of expanded point cloud. A negative pair consists of a normal grid of gradient image and a corresponding abnormal grid of expanded point cloud; an abnormal grid of gradient image and a corresponding normal grid of expanded point cloud; or an abnormal grid of gradient image and a corresponding abnormal grid of expanded point cloud.

The positive pairs may be obtained from the training dataset used to generate the grid weights 114 and the regression models 115, for example. Of course, positive pairs may also be obtained by having the object detection system 100 sense known benign environments. Negative pairs may be obtained by having the object detection system 100 sense known attacked environments. Negative pairs may also be generated from positive pairs by data pair augmentation. For example, abnormal grids may be generated by randomly selecting a grid, adding heavy noise to a grid, or by generative adversarial network (GAN).

Figure 10:
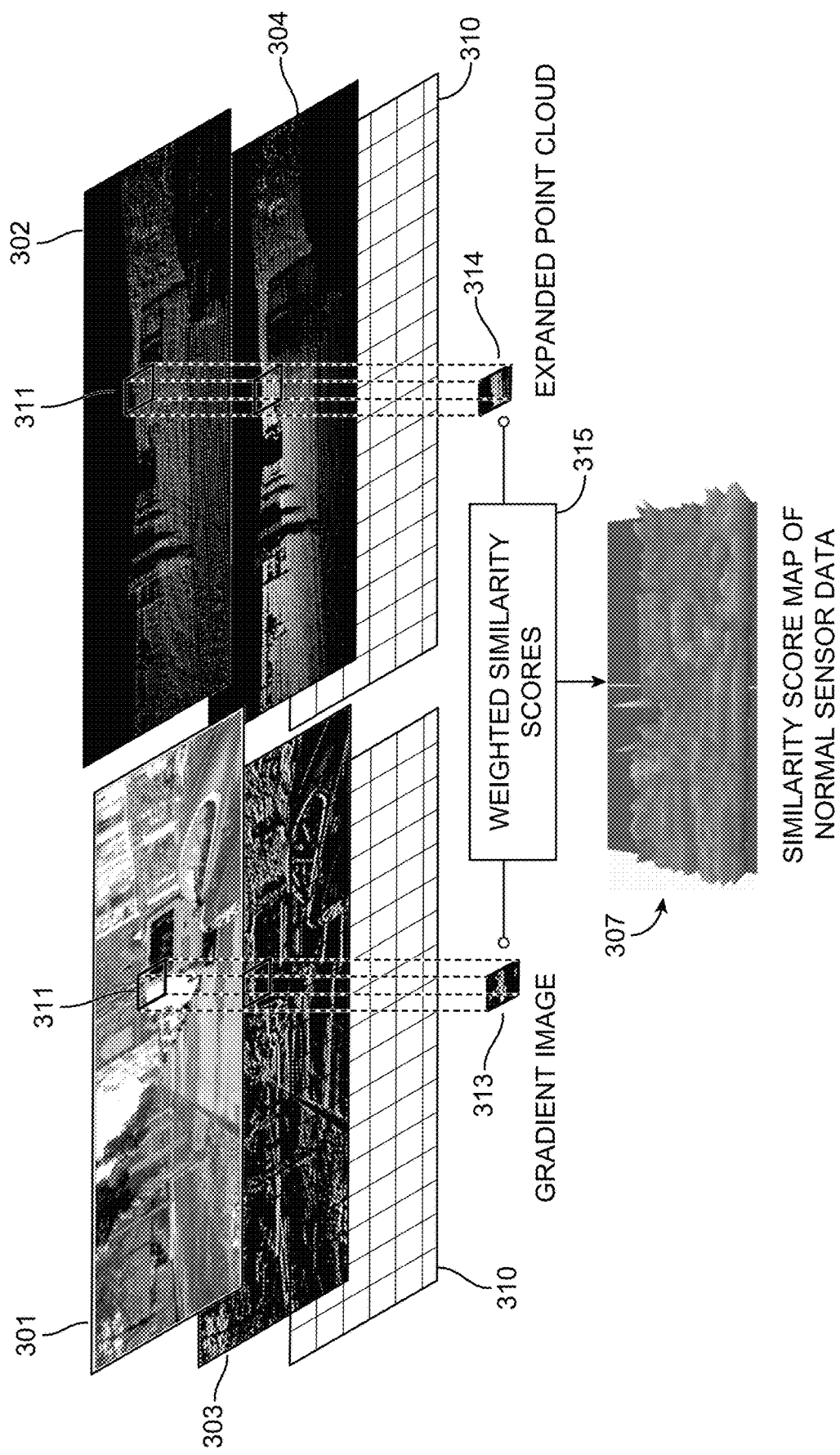
FIG. 10 pictorially illustrates generation of a similarity score map in accordance with an embodiment of the present invention.

FIG. 10 pictorially illustrates generation of a similarity score map in accordance with an embodiment of the present invention. The score map is a map of similarity scores for all grids of sensor data. In the example of FIG. 10, a raw image (FIG. 10, 301) and a raw point cloud (FIG. 10, 302) are generated by the camera 101 and the LIDAR sensor 102, respectively, of the object detection system 100 (shown in FIG. 1). The raw image is preprocessed by converting the raw image to a gradient image (FIG. 10, 303) to enhance the edges of the image. The raw point cloud is preprocessed by horizontally expanding points of the point cloud (FIG. 10, 304). The gradient image and the expanded point cloud are divided into a plurality of corresponding grids (FIG. 10, 310). As an example, a portion 313 of the gradient image and a portion 314 of the expanded point cloud are on the same grid that corresponds to the region 311 of the sensed environment.

A similarity score is calculated for each grid using the similarity model 112 (shown in FIGS. 1 and 9). The grid weights 114 (shown in FIGS. 1 and 2) are applied to the similarity scores on each grid to generate weighted similarity scores (FIG. 10, 315). In the example of FIG. 10, a similarity score map 307 is a map of weighted similarity scores for all of the grids. In the example of FIG. 10, the similarity score map 307 is for a benign environment, i.e., normal sensor data.

Figure 11:
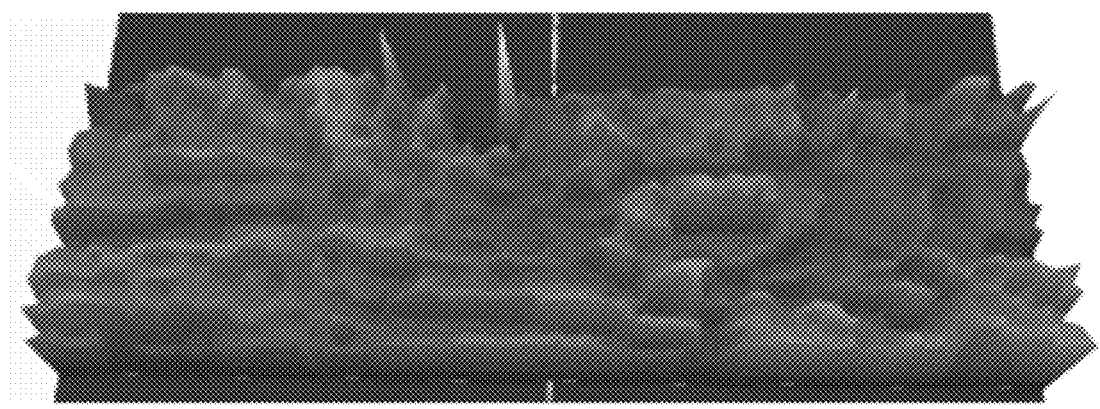
FIG. 11 shows example similarity score maps of normal sensor data and abnormal sensor data in accordance with an embodiment of the present invention.
Figure 11:
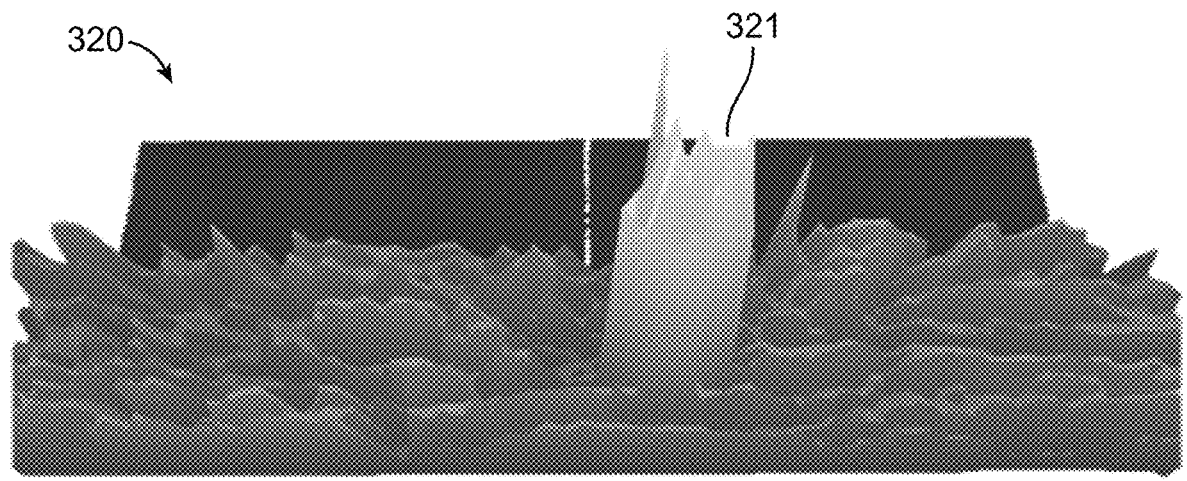

On a similarity score map, lower peaks indicate higher similarity between the image and point cloud. FIG. 11 shows the similarity score map 307 (also shown in FIG. 10) and a similarity score map 320 for comparison. The similarity score map 307 is for normal sensor data and thus have relatively low peaks. In contrast, the similarity score map 320 is for abnormal sensor data. Note the presence of a peak 321 in the similarity score map 320, compared to the absence of peaks in the similarity score map 307. The peak 321 indicates dissimilarity of the image and point cloud on the same grid, indicating an attack.

Figure 12:
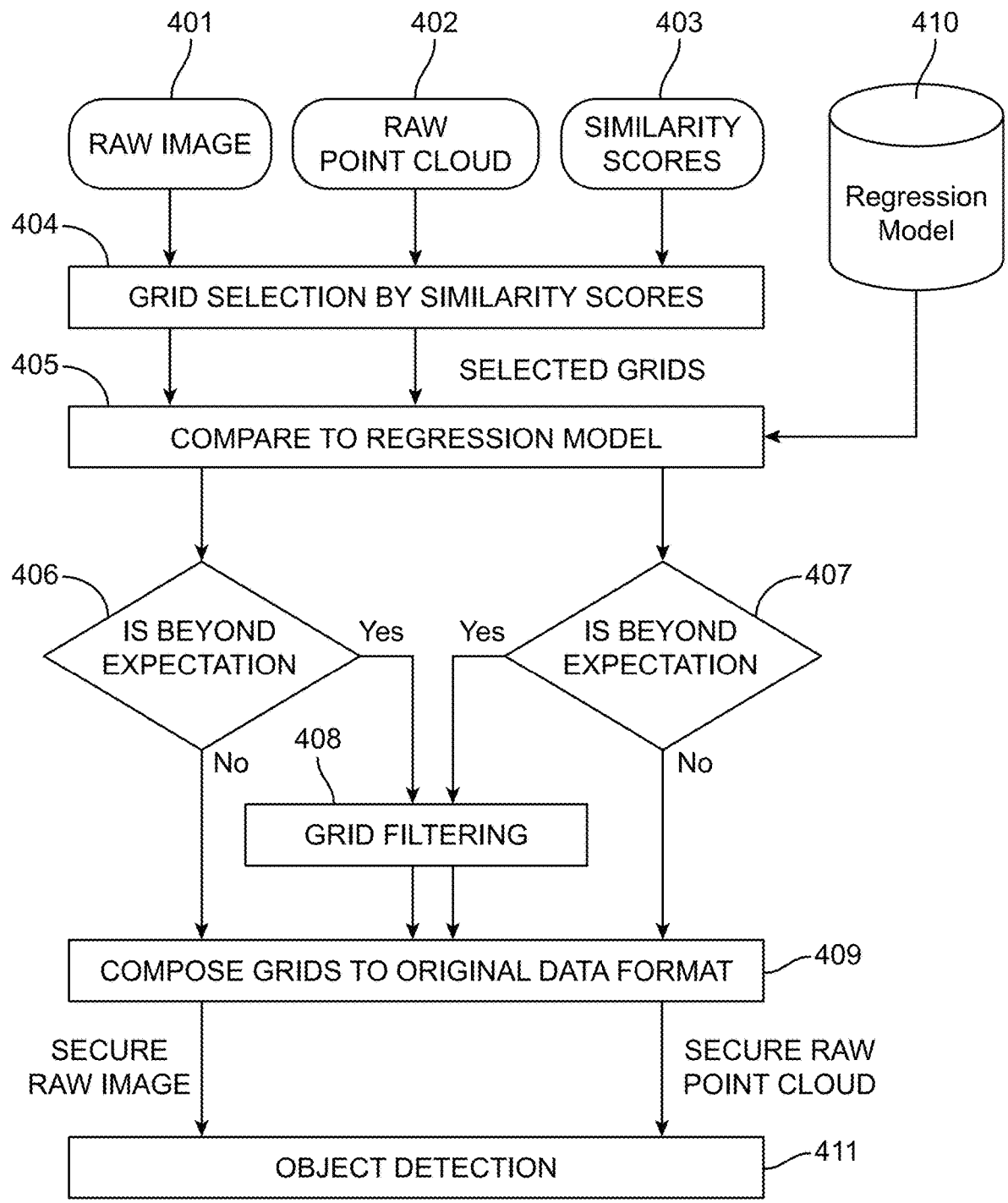
FIG. 12 shows a flow diagram of a method of filtering abnormal sensor data in accordance with an embodiment of the present invention.

FIG. 12 shows a flow diagram of a method of filtering abnormal sensor data in accordance with an embodiment of the present invention. In the example of FIG. 12, the method receives as inputs a raw image (FIG. 12, 401), a raw point cloud (FIG. 12, 402), and similarity scores (FIG. 12, 403) of grids of the raw image and raw point cloud. The similarity scores may be generated as previously discussed.

The following steps identify abnormal grids as those having a low similarity score or those that do not follow the regression model. The similarity scores of the grids are compared to a fixed or dynamic similarity threshold (FIG. 12, 404). Grids that have a similarly score lower than the threshold are deemed to be abnormal and are thus filtered in a subsequent grid filtering step (see FIG. 12, 408). Grids that have a similarly score that is equal to or greater than the threshold are selected for further processing. For each selected grid, the directional pattern strengths of the gradient image and expanded point cloud on the grid are compared to a corresponding regression model (FIG. 12, 410) to determine if the selected grid is abnormal (FIG. 12, 405) as previously described. Abnormal grids of the image are filtered in a grid filtering step (FIGS. 12, 406 to 408). Similarly, abnormal grids of the point cloud are filtered in the grid filtering step (FIGS. 12, 407 to 408). The raw image and raw point cloud are recomposed to their original format, with sensor data on the abnormal grids being filtered to generate the secure raw image and the secure raw point cloud (FIG. 12, 409). The secure raw image and the secure raw point cloud are employed by the perception engine for object detection (FIG. 12, 411).

FIG. 13 schematically shows filtering of abnormal grids in accordance with an embodiment of the present invention. In the example of FIG. 13, grids 511-535 represent grids of the raw image and the raw point cloud. Only a few grids are shown for clarity of illustration. As explained, each of the grids 511-535 is on a portion of the raw image and a portion of the raw point cloud that depict a corresponding region of the sensed environment. In the example of FIG. 13, grids 519, 523, and 524 have been detected to be abnormal. Accordingly, grids 519, 523, and 524 are filtered. That is, the portions of the raw image and the raw point cloud on the grids 519, 523, and 524 are filtered. The raw sensor data for the remaining grids (i.e., grids 511-518, 520-522, and 525-535) are recomposed to their original format and provided to the perception engine to be processed for object detection.

Image data on an abnormal grid may be filtered by applying a heavy blurring operation to eliminate edge strength, so that the perception engine ignores information on the grid. Point cloud data on a grid may be filtered by calculating the signal-to-noise ratio (SNR) or peak signal-to-noise ratio (PSNR) for all nearby normal grids and thereafter applying noise addition/removal until the SNR of the abnormal grid becomes similar to the nearby normal grids while obeying the distribution (e.g., gaussian) of the nearby grids.

Figure 14:
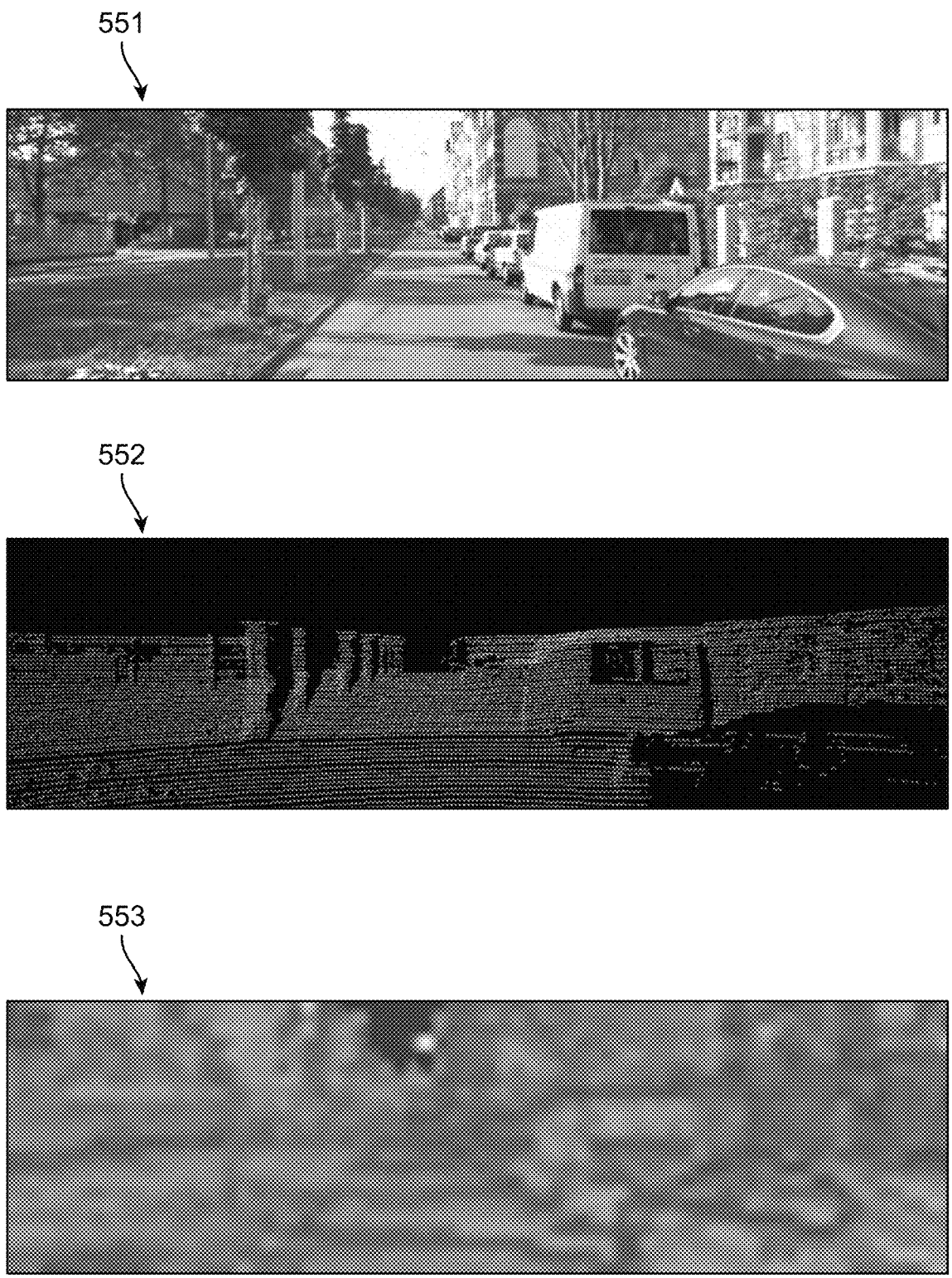
FIGS. 14 and 15 show example preprocessed image and point cloud to detect abnormal sensor data.
Figure 15:
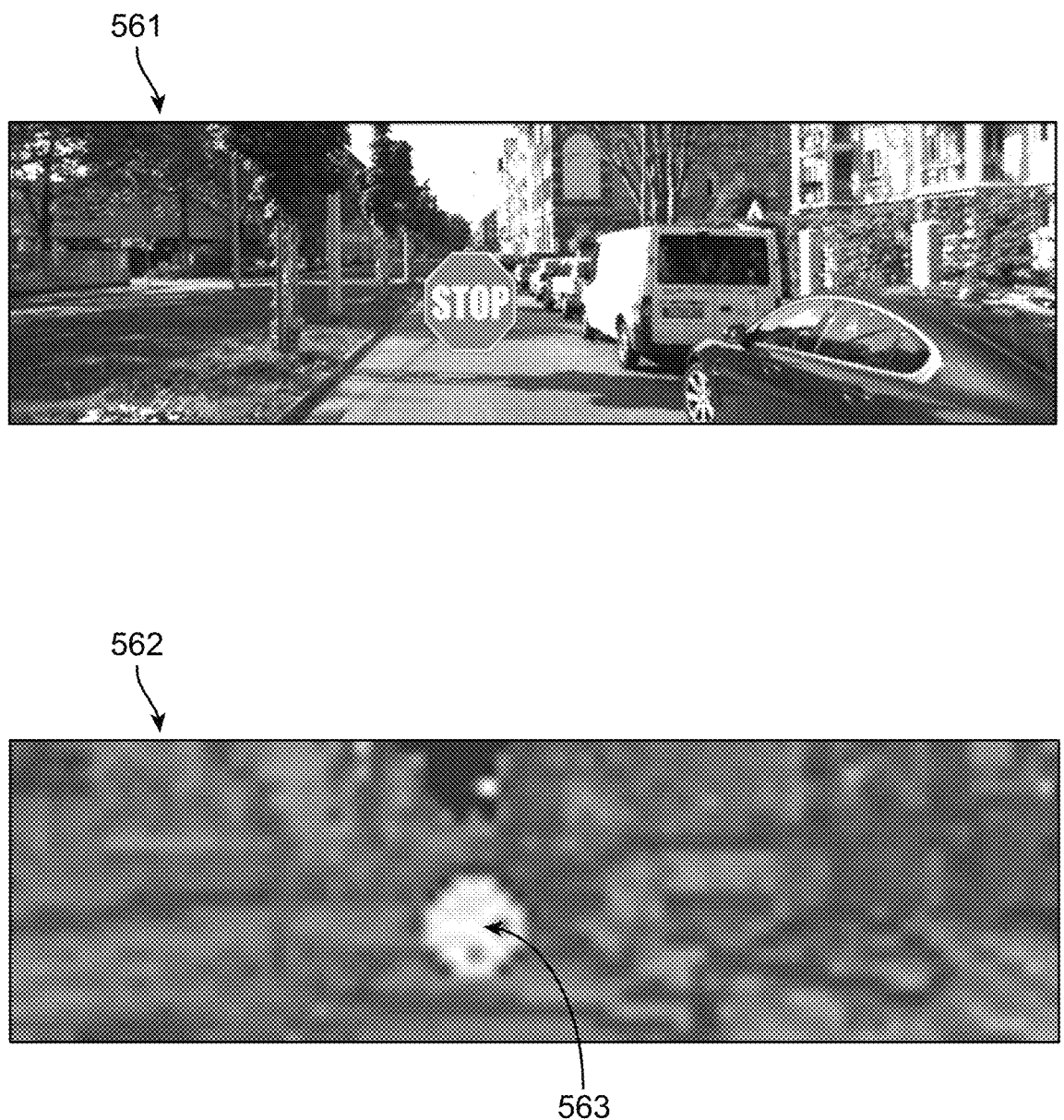

FIGS. 14 and 15 show example preprocessed image and point cloud to detect abnormal sensor data. In FIG. 14, an image 551 depict a benign environment. Points of a point cloud that depicts the benign environment are horizontally expanded to generate the expanded point cloud 552. The image 551 is converted to a gradient image 553.

Continuing in FIG. 15, an image 561 is the image 551 (see FIG. 14, 551) overlayed with attack information, which is illustrated in FIG. 15 as a stop sign. The attack information is only on the image 561, and accordingly not depicted by the expanded point cloud 552 (see FIG. 14, 552). The image 561 is converted to a gradient image 562. The attack information causes one or more grids (around arrow 563) of the gradient image 562 to be dissimilar to corresponding grids on the expanded point cloud 552, thereby allowing for detection and filtering of the attack information as previously described.

Figure 16:
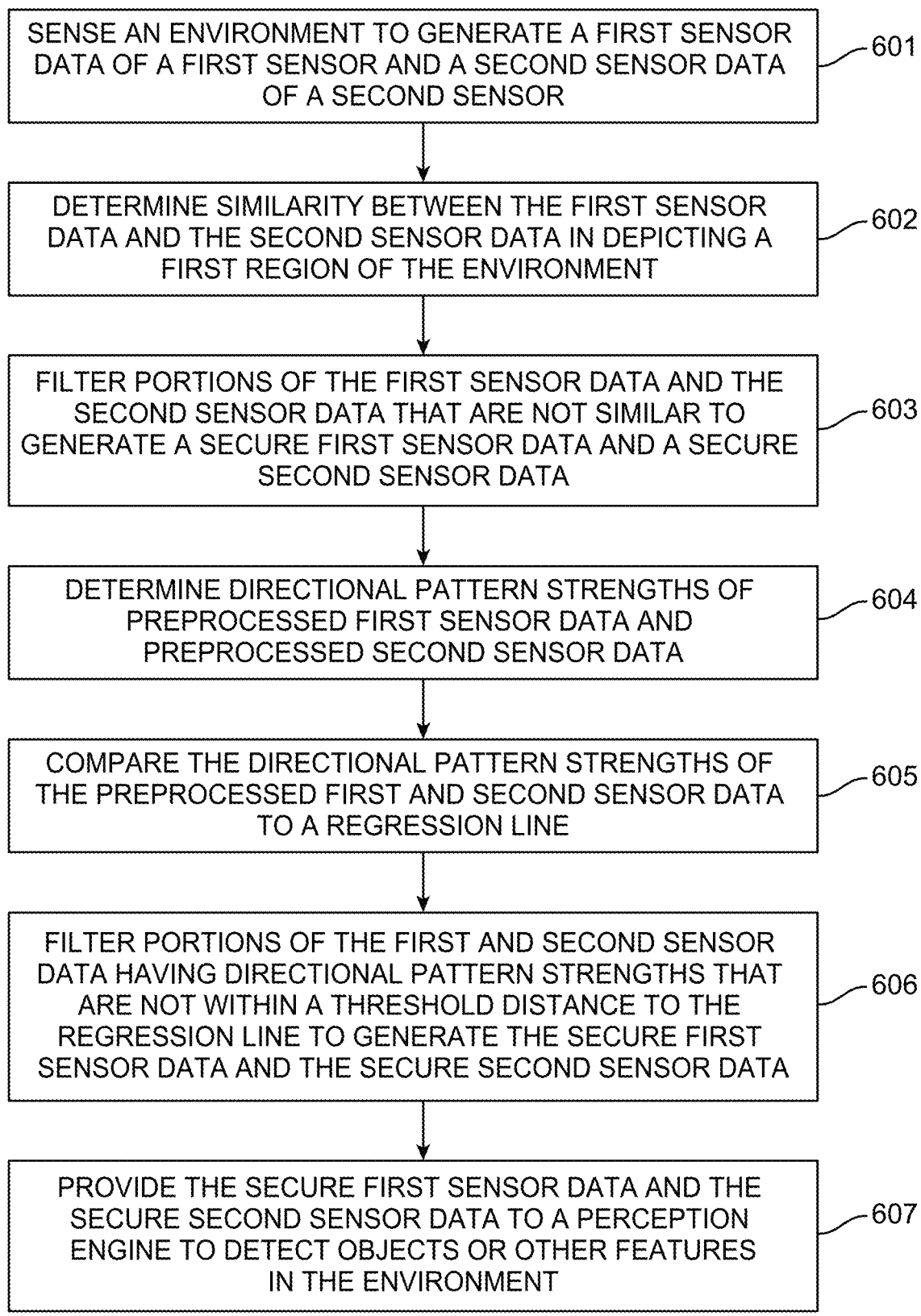
FIG. 16 shows a flow diagram of a method of filtering abnormal sensor data for an object detection system of a vehicle in accordance with an embodiment of the present invention.

FIG. 16 shows a flow diagram of a method of filtering abnormal sensor data for an object detection system of a vehicle in accordance with an embodiment of the present invention. The method of FIG. 16 is explained using previously discussed embodiments for illustration purposes. As can be appreciated, other components and steps may also be employed without detracting from the merits of the present invention.

In the method of FIG. 16, an environment is sensed to generate a first sensor data (e.g., image) of a first sensor (e.g., camera) and a second sensor data (e.g., point cloud) of a second sensor (e.g., LIDAR sensor) (FIG. 16, 601). A similarly between the first sensor data and the second sensor data in depicting a first region of the environment is determined (FIG. 16, 602). Portions of the first sensor data and the second sensor data on the same grid that are not similar are deemed abnormal and accordingly filtered to generate a secure first sensor data and a secure second sensor data (FIG. 16, 603). The filtering of the abnormal sensor data is such that the abnormal sensor data are ignored by the perception engine.

The directional pattern strengths of preprocessed first sensor data (e.g., gradient image) and preprocessed second sensor data (e.g., expanded point cloud) are determined (FIG. 16, 604). The directional pattern strengths of the preprocessed first sensor data and preprocessed second sensor data are compared to a regression curve (FIG. 16, 605). Portions of the first and second sensor data having directional pattern strengths that are not within a threshold distance to the regression curve are filtered to generate the secure first sensor data and the secure second sensor data (FIG. 16, 606). The secure first sensor data and the secure second sensor data are provided to the perception engine to detect objects or other features in the environment (FIG. 16, 607).

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of filtering abnormal sensor data for an object detection system of a vehicle, the method comprising:
   generating a preprocessed image by preprocessing a raw image received from a camera of the object detection system;
   generating a preprocessed point cloud by preprocessing a raw point cloud received from a LIDAR sensor of the object detection system;
   determining a similarity between a region of the preprocessed image and a region of the preprocessed point cloud;
   in response to detecting that the region of the preprocessed image is not similar to the region of the preprocessed point cloud, generating a secure raw image by filtering image data of the raw image that corresponds to the region of the preprocessed image;

in response to detecting that the region of the preprocessed image is not similar to the region of the preprocessed point cloud, generating a secure raw point cloud by filtering point cloud data of the raw point cloud that corresponds to the region of the preprocessed point cloud;

detecting an object in a sensed environment using the secure raw image and the secure raw point cloud.

2. The method of claim 1, wherein generating the preprocessed image and generating the preprocessed point cloud comprises:

converting the raw image into a gradient image;

expanding points of the raw point cloud to generate an expanded point cloud; and dividing the gradient image and the expanded point cloud into a plurality of corresponding grids.

3. The method of claim 2, wherein the region of the of the preprocessed image is a grid of the preprocessed image, and the region of the preprocessed point cloud is a grid of the preprocessed point cloud.

4. The method of claim 3, wherein determining the similarity between the region of the preprocessed image and the region of the preprocessed point cloud comprises:

calculating a similarity score for the grid of the preprocessed image and the grid of the preprocessed point cloud;

weighing the similarity score to generate a weighted similarity score; and comparing the weighted similarity score to a threshold.

5. The method of claim 4, wherein weighing the similarity score includes adjusting the similarity score by a predetermined value.

6. An object detection system of a vehicle, the object detection system comprising:

a camera that generates an image of an environment that is forward of the vehicle;

a LIDAR sensor that generates a point cloud of the environment; and a data inspector comprising a memory and a processor, the memory storing instructions that when executed by the processor cause the data inspector to:

determine a similarity between the image and the point cloud in depicting a first region of the environment;

in response to detecting that the image and the point cloud are not similar in depicting the first region of the environment, filter a first portion of the image and a first portion of the point cloud that depict the first region of the environment to generate a secure image and a secure point cloud; and provide the secure image and the secure point cloud to a perception engine to detect one or more objects in the environment.

7. The object detection system of claim 6, wherein the instructions stored in the memory of the data inspector, when executed by the processor of the data inspector, cause the data inspector to determine the similarity between the image and the point cloud in depicting the first region of the environment by:

converting the image to a gradient image;

horizontally expanding the point cloud to generate an expanded point cloud;

dividing the gradient image and the expanded point cloud into a plurality of corresponding grids; and determining a similarity between a first grid of the gradient image and a first grid of the expanded point cloud that correspond to the first region of the environment.

8. The object detection system of claim 7, wherein the instructions stored in the memory of the data inspector, when executed by the processor of the data inspector, further cause the data inspector to:

detect a directional pattern strength of a second grid of the gradient image;

detect a directional pattern strength of a second grid of the expanded point cloud, the second grids of the gradient image and the expanded point cloud depicting a second region of the environment;

compare the directional pattern strengths of the second grids of the gradient image and the expanded point cloud to a regression curve; and detect that the second grids of the gradient image and the expanded point cloud are abnormal in response to the directional pattern strengths of the second grids of the gradient image and the expanded point cloud not being within a predetermined distance of the regression curve.

9. The object detection system of claim 8, wherein the instructions stored in the memory of the data inspector, when executed by the processor of the data inspector, further cause the data inspector to:

filter a second portion of the image and a second portion of the point cloud that depict the second region of the environment to generate the secure image and the secure point cloud.

* * * * *